(12) United States Patent
Kobayashi

(10) Patent No.: US 7,098,118 B2
(45) Date of Patent: Aug. 29, 2006

(54) METHOD AND APPARATUS FOR MACHINING SUBSTRATE

(75) Inventor: Kazuo Kobayashi, Mitaka (JP)

(73) Assignee: Tokyo Seimitsu Co., Ltd., Tokyo (JP)

( * ) Notice: Subject to any disclaimer, the term of this patent is extended or adjusted under 35 U.S.C. 154(b) by 69 days.

(21) Appl. No.: 10/712,364

(22) Filed: Nov. 12, 2003

(65) Prior Publication Data

US 2004/0126996 A1    Jul. 1, 2004

(30) Foreign Application Priority Data

Dec. 27, 2002    (JP)    ............................. 2002-381129

(51) Int. Cl.
*H01L 21/46* (2006.01)
*H01L 21/78* (2006.01)
*H01L 21/301* (2006.01)

(52) U.S. Cl. ..................................... 438/460
(58) Field of Classification Search .................. 438/460
See application file for complete search history.

(56) References Cited

U.S. PATENT DOCUMENTS

| | | | | |
|---|---|---|---|---|
| 4,355,457 | A * | 10/1982 | Barlett et al. | 438/460 |
| 4,904,610 | A * | 2/1990 | Shyr | 438/463 |
| 5,543,365 | A * | 8/1996 | Wills et al. | 438/462 |
| 5,824,177 | A * | 10/1998 | Yoshihara et al. | 156/250 |
| 6,271,102 | B1 * | 8/2001 | Brouillette et al. | 438/462 |
| 6,602,762 | B1 * | 8/2003 | Hwan et al. | 438/460 |
| 6,734,083 | B1 * | 5/2004 | Kobayashi | 438/462 |
| 6,838,299 | B1 * | 1/2005 | Mulligan et al. | 438/33 |
| 2001/0034564 | A1 * | 10/2001 | Jones | 700/166 |
| 2002/0031899 | A1 * | 3/2002 | Manor | 438/460 |
| 2004/0026382 | A1 * | 2/2004 | Richerzhagen | 219/121.6 |
| 2004/0188400 | A1 * | 9/2004 | Peng et al. | 219/121.72 |
| 2005/0003633 | A1 * | 1/2005 | Mahle et al. | 438/463 |

FOREIGN PATENT DOCUMENTS

| | | |
|---|---|---|
| EP | 1 255 280 A2 | 11/2002 |
| JP | 63-293939 | 11/1988 |
| JP | 2002-75919 | 3/2002 |
| JP | 2002-075919 | 3/2002 |

OTHER PUBLICATIONS

Corresponding European Patent Application Search Report, dated Apr. 1, 2004.

(Continued)

*Primary Examiner*—W. David Coleman
(74) *Attorney, Agent, or Firm*—Christie, Parker & Hale, LLP

(57) ABSTRACT

In a substrate machining method for machining a substrate, there are provided a substrate machining method in which a disk-like blade is rotated to cut the substrate from its one surface, and the cut surfaces of the substrate, which are positioned in the vicinity of the other surface of the substrate, are irradiated with laser light; and a substrate machining apparatus which carries out the substrate machining method. The entirety of the cut surfaces of the substrate may be irradiated with the laser light. The laser may be a YAG laser or a CO$_2$ laser. Further, a dicing tape may be adhered to the other surface of the substrate, and the laser light may be irradiated after cutting only the substrate and expanding the dicing tape. Modified layers are formed by an irradiation of the laser light, so that dice are prevented from being broken in an assembling operation of the dice.

6 Claims, 5 Drawing Sheets

OTHER PUBLICATIONS

Patent Abstract of Japan 63293939, dated Nov. 30, 1988, in the name of Shigeyuki.

Patent Abstract of Japan, Publication No. 2002075919 A, Published on Mar. 15, 2002, in the name of Kirihara.

* cited by examiner

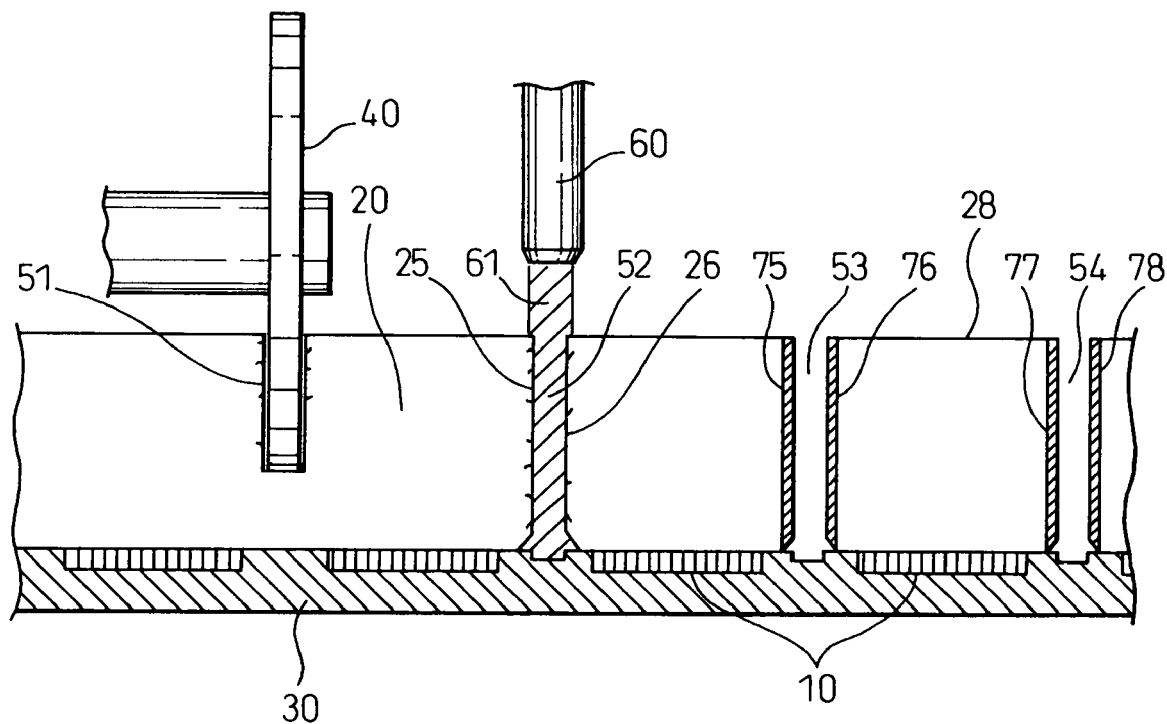

METHOD AND APPARATUS FOR MACHINING SUBSTRATE

CROSS-REFERENCE TO RELATED APPLICATION

This application claims priority of Japanese Patent Application Number 2002-381129, filed on Dec. 27, 2002.

BACKGROUND OF THE INVENTION

1. Field of the Invention

The present invention relates to a method and apparatus for machining a substrate such as, for example, a semiconductor wafer.

2. Description of the Related Art

In the field of manufacturing semiconductors, the dicing process for cutting a substrate such as, for example, a silicon wafer on which a plurality of semiconductor elements are formed, into cubic portions, i.e., dicing a substrate, is necessary. A substrate machining apparatus for dicing contains a disk-like blade. Before a dicing process, an adhesive dicing tape is attached to a wafer. After that, the blade is rotated to cut the wafer from its surface, on which no dicing tape is attached, while cutting water is supplied to the wafer. The blade is moved forward to form a street. Usually, only the wafer is cut without completely cutting the dicing tape. Streets are formed on the wafer in longitudinal and lateral directions so that a plurality of cubic dice are formed on the dicing tape. This is disclosed in, for example, FIG. 6 of Japanese Unexamined Patent Publication (Kokai) No. 2002-75919.

However, in the substrate machining method disclosed in Japanese Unexamined Patent Publication (Kokai) No. 2002-75919, there is a possibility that some problem may occur on a cut surface of the wafer. FIG. 4 is an enlarged sectional view of a diced substrate in a prior art. FIG. 5 is a partial perspective view of a diced substrate in a prior art. As shown in FIG. 4, chippings 910, 920 are formed on cut surfaces 210, 220 of a wafer 200, respectively, after a dicing operation, in the vicinity of lower edges of the cut surfaces 210, 220, i.e., in the vicinity of a dicing tape 300. As shown in FIG. 4, the chippings 910, 920 are also formed on the portion of the wafer 200 adjacent to the dicing tape 300, i.e., the bottom of the wafer 200. As shown in FIG. 5, such chippings 900 exist on the sides of chips or dice to be formed. Accordingly, cracks sometimes grow on the bottoms of chips or dice, so that the chips or dice are broken or become difficult to assemble, when stresses are applied to the chips or dice in picking-up and assembling operations of the chips or dice. Crushed layers, i.e., brittle fracture layers 810, 820 are formed in the cut surfaces 210, 220, along the thickness direction of the wafer 200. Likewise, there is a possibility that cracks may grow in the brittle fracture layers 810, 820 of the cut surfaces 210, 220 to break the chips or dice when stresses are applied to the chips or dice in picking-up and assembling operations of the chips or dice.

In view of the above problems, the object of the present invention is to provide a method and apparatus for machining a substrate which prevents chips and prevents dice from being broken in picking-up and assembling operations of the dice.

SUMMARY OF THE INVENTION

To achieve the above object, according to a first embodiment, there is provided a substrate machining method in which a disk-like blade is rotated to cut a substrate from its one surface and the edge of a cut surface of the substrate adjacent to the other surface of the substrate is irradiated with laser light.

Namely, according to the first embodiment, the strength of the cut surface is increased because chippings which may be formed in the cut surface are melted to form a modified layer such as, for example, an oxidized layer. Therefore, the chips or dice are prevented from being broken in picking-up and assembling operations of the dice.

BRIEF DESCRIPTION OF THE DRAWINGS

FIG. 3 is a schematic view of a substrate machining method according to the present invention;

DESCRIPTION OF THE PREFERRED EMBODIMENTS

Figure 1A:
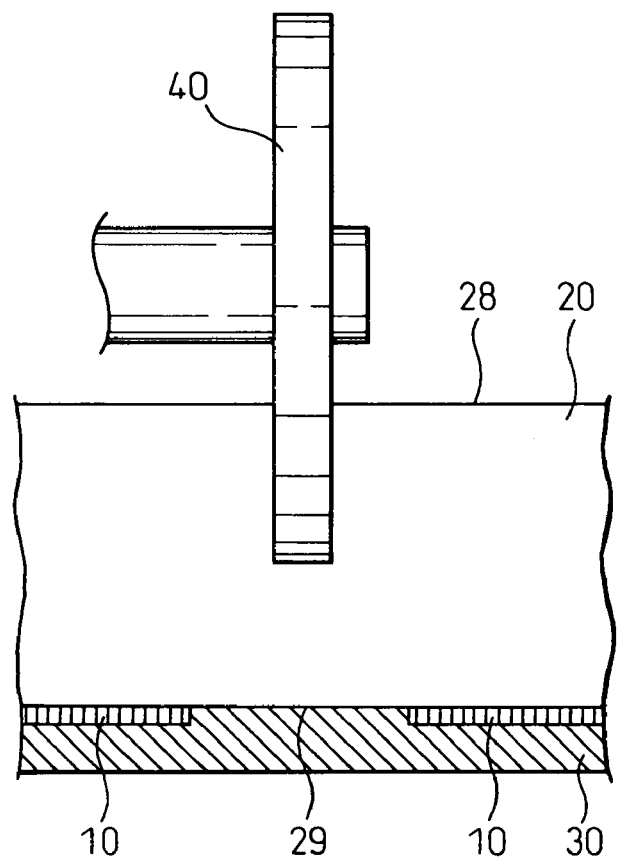
FIG. 1a is a conceptual view showing a cutting operation of a substrate machining method according to the present invention.

Embodiments of the present invention will be described below with reference to the accompanying drawings. In the drawings, the same members are designated by the same reference numerals. For easy understanding, the scale of each drawing is appropriately changed.

Figure 1B:
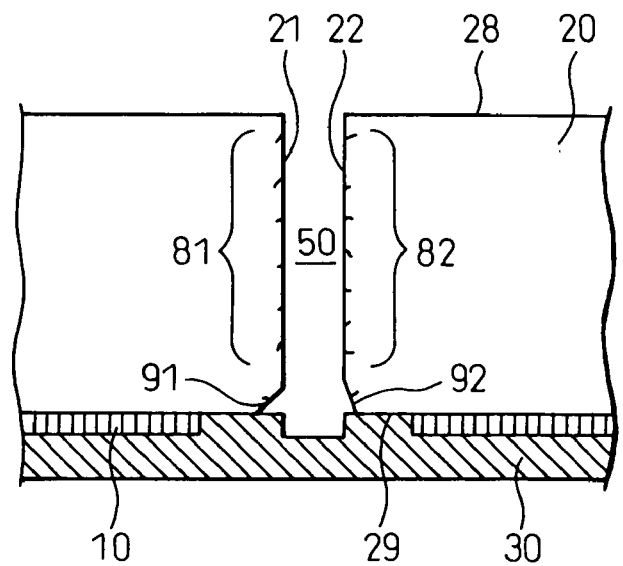
FIG. 1b is a conceptual view showing a cutting operation of a substrate machining method according to the present invention.

FIGS. 1a and 1b are conceptual views showing a cutting operation of a substrate machining method according to the present invention. As shown in FIG. 1a, semiconductor elements 10 are formed on a semiconductor substrate and, for example, on a silicon wafer 20. Usually, semiconductor elements 10 are formed in the shape of dice on the wafer 20. However, for easy understanding, only two semiconductor elements are shown in FIGS. 1 and 2. As can be seen from FIGS. 1a and 1b, a patterned surface 29 of the wafer 20, on which semiconductor elements 10 are formed, is covered with a dicing tape 30 or a protective film 30.

The substrate machining apparatus according to the present invention contains a disk-like blade 40. Abrasive grains are attached to the outer periphery of the disk-like blade 40. The disk-like blade 40 is controllably driven by an appropriate motor (not shown) coupled to the blade. As shown in FIG. 1a, the wafer 20 is cut by the disk-like blade 40 from a backside 28 of the wafer 20. In this cutting operation, only a part of the dicing tape 30 is removed. Therefore, as shown in FIG. 1b, a street 50 is formed between cut surfaces 21, 22 formed by the disk-like blade 40. The street 50 is formed in a direction perpendicular to the paper, on which FIG. 1 is drawn, because the rotating disk-like blade 40 is moved across the wafer 20.

As described above, chippings 91, 92 are formed at lower edges of the cut surfaces 21, 22, i.e., the edges adjacent to the patterned surface 29, respectively. Likewise, crushed layers, i.e., brittle fracture layers 81, 82 are formed in the cut surfaces 21, 22, respectively. The brittle fracture layers 81, 82 and the chippings 91, 92 are discontinuously formed along the street 50 (in a direction perpendicular to the paper on which FIG. 1 is drawn).

Figure 2A:
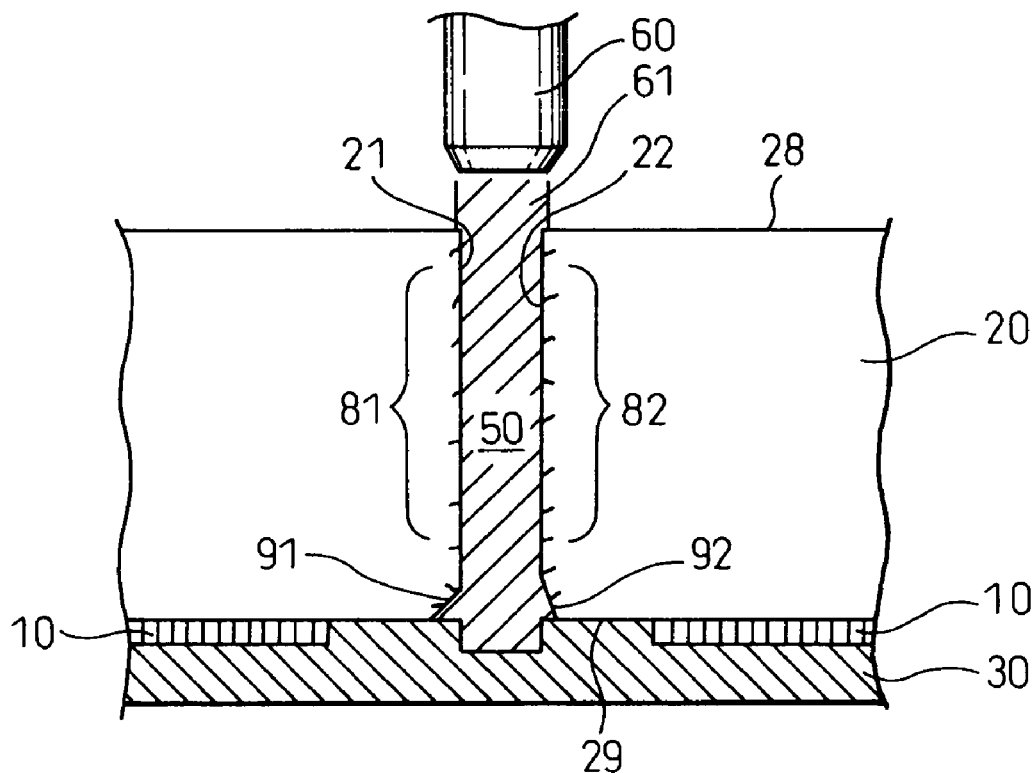
FIG. 2a is a conceptual view showing a laser light irradiating operation of a substrate machining method according to the present invention.
Figure 2B:
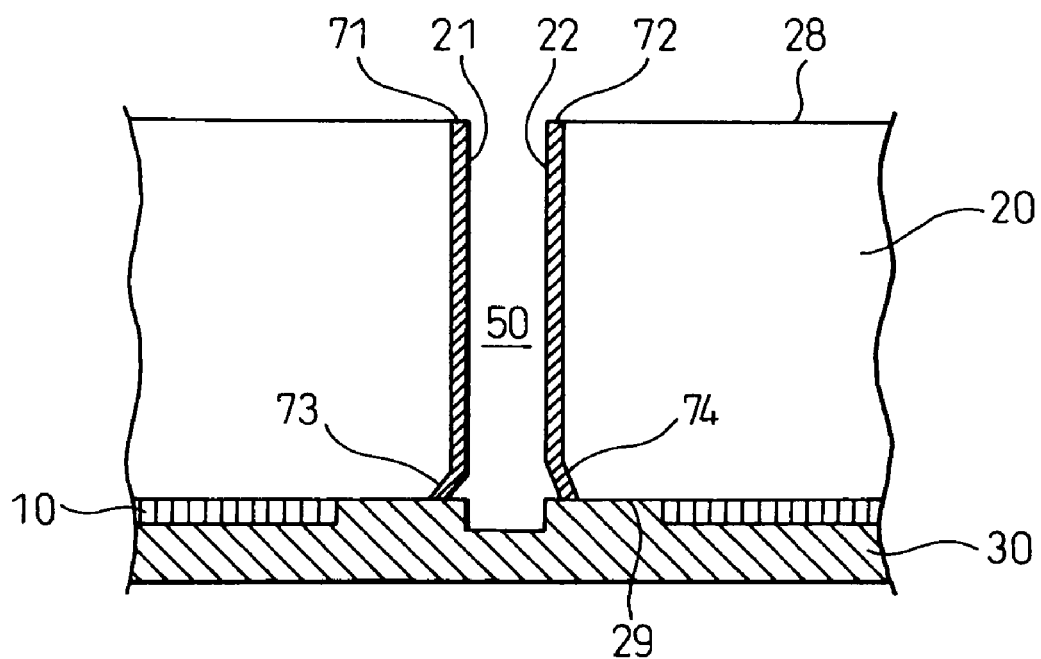
FIG. 2b is a conceptual view showing a laser irradiating operation of a substrate machining method according to the present invention.
Figure 4:
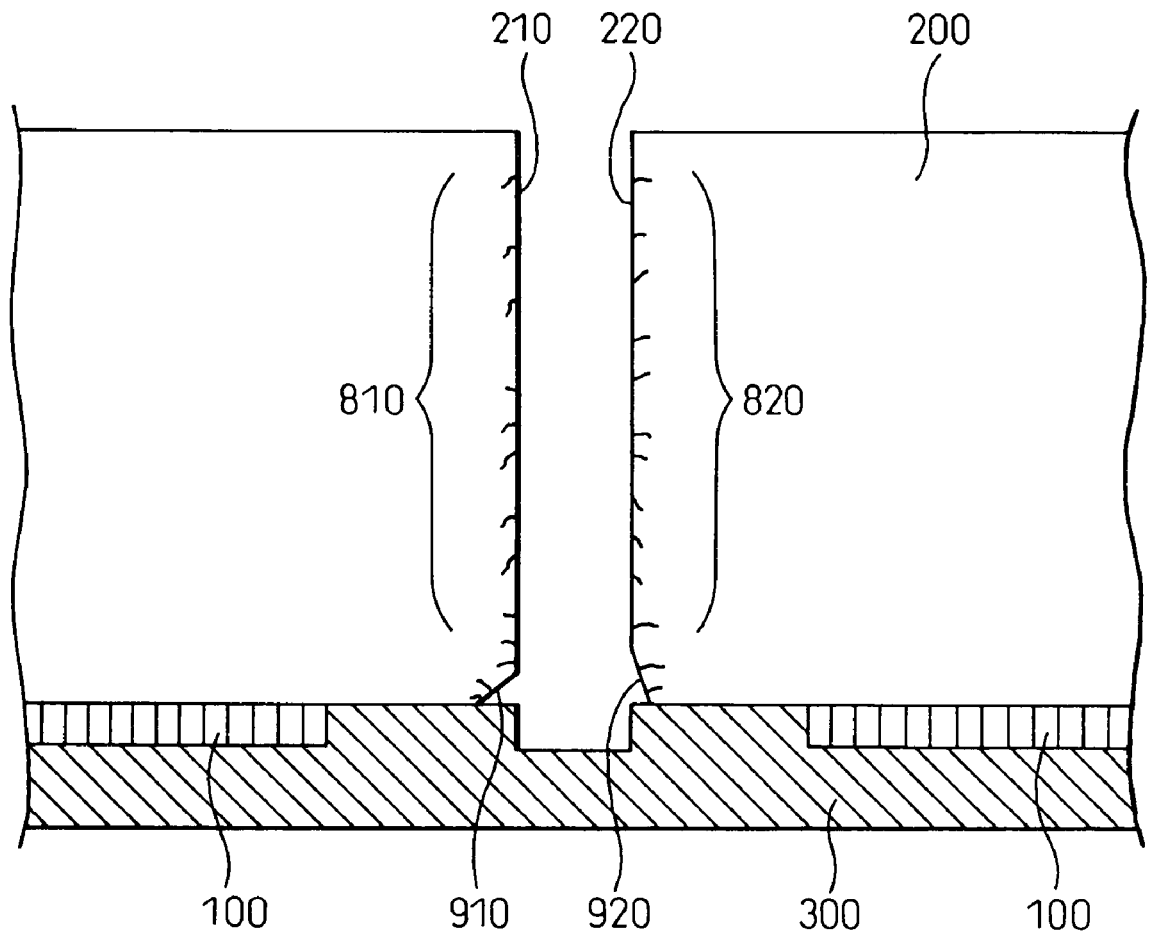
FIG. 4 is an enlarged sectional view of a diced substrate in a prior art.
Figure 5:
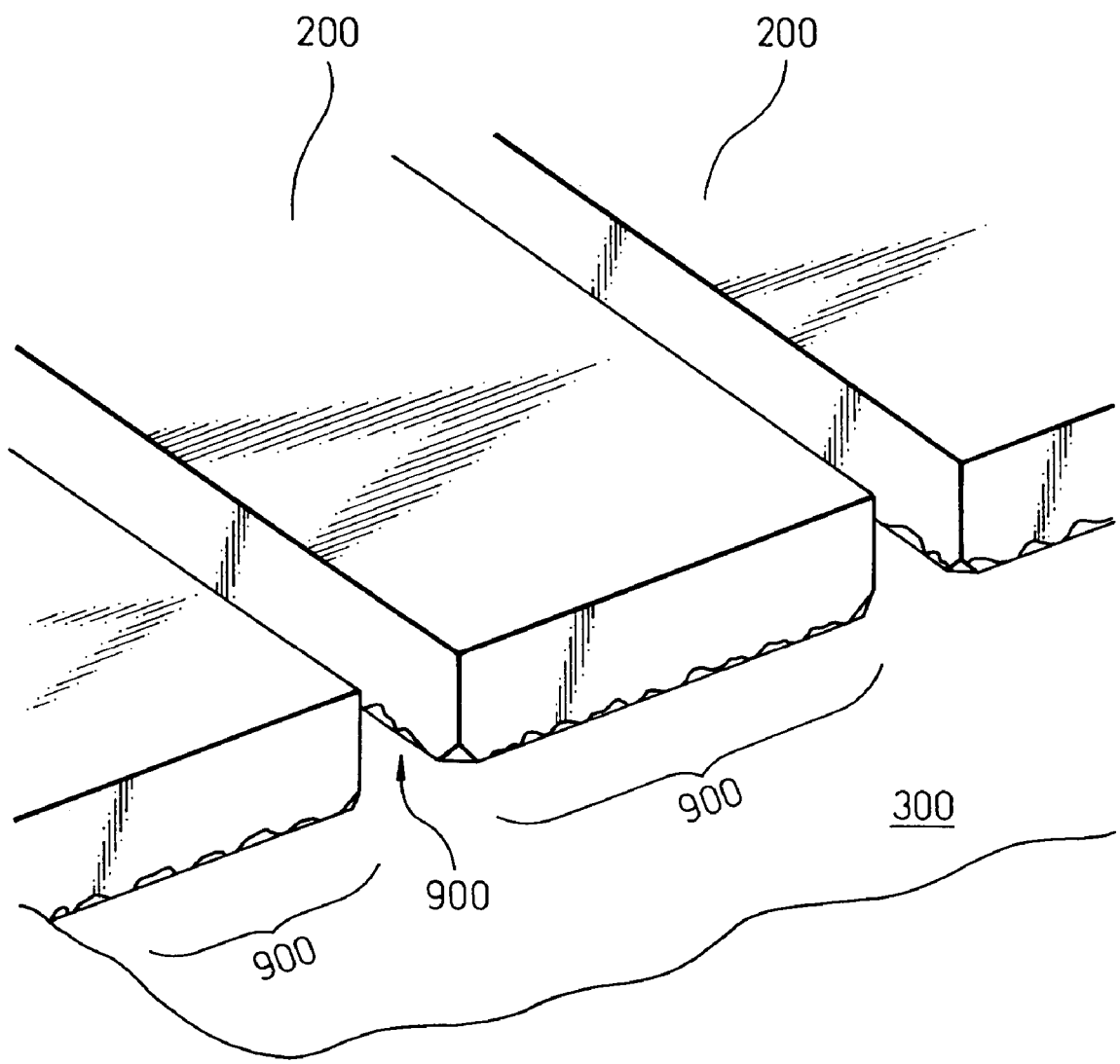
FIG. 5 is a partial perspective view of a diced substrate in a prior art.

FIGS. 2a and 2b are conceptual views showing a laser irradiating operation of a substrate machining method according to the present invention. As shown in FIG. 2a, a laser irradiating portion 60 is located above the back side 28, and is positioned between the cut surfaces 21, 22. After that, a laser light 61 is irradiated from the laser light irradiating portion 60. Therefore, the cut surfaces 21, 22 of the wafer 20, particularly, the chippings 91, 92 are heated and melted. After that, the irradiation of the laser light 61 from the laser light irradiating portion 60 is stopped. Thus, the melted portions of the chippings 91, 92 are cooled and hardened, so that modified layers 73, 74 are formed on surfaces of the chippings 91, 92, respectively. The strength of the modified layers is larger than that of the wafer 20 because the modified layers 73, 74 are oxidized layers that are oxidized by the above-described irradiation of laser light. After that, streets are formed on the wafer 20 in longitudinal and lateral directions, so that a plurality of chips or dice in the shape of dice (not shown) are arranged on the dicing tape 30. Therefore, the cut surfaces of the wafer 20 become side faces of the chips or dice. After that, one of the dice each including one semiconductor element 10 is picked up and assembled. In the present invention, the dice are prevented from being broken in picking-up and assembling operations of the dice because the strength of the side faces of the dice is increased.

Likewise, the brittle fracture layers 81, 82, which are formed in the cut surfaces 21, 22 when a dicing operation is carried out, become modified layers 71, 72 by irradiation of laser light. Namely, the strength of the cut surfaces 21, 22 is increased because the brittle fracture layers 81, 82 are melted and then hardened. Therefore, the dice are prevented from being broken in picking-up and assembling operations of the dice.

Usually, cutting water is supplied to a cut portion when a dicing operation is carried out. Therefore, it is preferable that the laser light 61 irradiated from the laser light irradiating portion 60 be a $CO_2$ laser light or a YAG laser light. Accordingly, the irradiation of the laser light can be appropriately carried out without the influence of the cutting water. Namely, even when the cutting water remains in the street 50, the brittle fracture layers 81, 82 and the chippings 91, 92 are appropriately irradiated with the laser. As a matter of course, the laser 61 may be irradiated after removing the cutting water from the street 50 by an air flow or drying the cutting water. In this case, laser light whose output is smaller than the $CO_2$ laser light or the YAG laser light, for example, excimer laser light can be adopted. A focus of the laser light 61 is moved, so that a specific portion of the cut surfaces 21, 22, for example, the chipping or brittle fracture layer can be selectively irradiated with the laser light. As a matter of course, the entirety of opposed cut surfaces may be irradiated with the laser light, or only a part of one cut surface may be irradiated with the laser light.

It is possible to expand the dicing tape 30, for example, in leftward and rightward directions in the drawing after cutting the wafer 20 by the disk-like blade 40, and to irradiate the laser light thereafter. In this case, the wafer 20 can be easily machined by a laser light having a large diameter because a distance between the cutting surfaces 21, 22 is increased by the expansion.

FIG. 3 is a schematic view of a substrate machining method according to the present invention. In FIG. 3, streets 52, 53 and 54 have been formed by the disk-like blade 40, and the disk-like blade 40 is forming a street 51. The streets 53, 54 have been irradiated with the laser light, and modified layers 75, 76 and modified layers 77, 78 are formed, respectively. As shown in FIG. 3, in the present invention, while the street 51 is formed by the disk-like blade 40, another street, for example, the street 52 can be irradiated with the laser light by the laser light irradiating portion 60. Thus, modified layers are formed in the cutting surfaces 25, 26 in the street 52. In such a case, the wafer can be machined with no influence on operation time because a laser light irradiating operation can be carried out while a usual dicing operation is carried out in the substrate machining apparatus.

The laser irradiating portion 60 may be moved to follow the disk-like blade 40 when the disk-like blade 40 forms a street. In this case, the laser irradiating portion 60 is moved along the street that is being formed by the disk-like blade 40. Thus, the wafer can be machined with no influence on operation time.

As a matter of course, it is obvious that method and apparatus for machining a substrate according to the present invention can be applied to a substrate other than a silicon wafer, for example, a glass substrate.

According to the present invention, a common effect can be obtained in which the dice are prevented from being broken in picking-up and assembling operation of the dice because the strength of the cut surfaces is increased by melting the chips, that may be formed in the cut surfaces, to form modified layers.

The invention claimed is:

1. A semiconductor wafer machining method for machining a semiconductor wafer having a patterned surface covered with a dicing tape, comprising the steps of:
   carrying out an entire cut through the semiconductor wafer with a cutting blade to form lateral surfaces;
   said cutting blade also partially cutting the dicing tape and forming chippings at lower edges of the lateral surfaces; and
   irradiating the lateral surfaces and the chippings with laser light to form a modified layer by melting.

2. The semiconductor wafer machining method according to claim 1, wherein an entirety of the lateral surfaces of the semiconductor wafer is irradiated with the laser light.

3. The semiconductor wafer machining method according to claim 1, wherein the laser is a YAG laser or a $CO_2$ laser.

4. The semiconductor wafer machining method according to claim 1, wherein the laser light is irradiated after cutting only the semiconductor wafer and expanding the dicing tape.

5. The semiconductor wafer machining method according to claim 1, wherein the laser light is irradiated onto the lateral surface of a first cut that has been already formed and is different from a second cut being formed by the cutting blade.

6. The semiconductor wafer machining method according to claim 1, wherein the laser light is irradiated onto the lateral surfaces of the cut that is being formed by cutting the semiconductor wafer by the cutting blade while following the movement of the cutting blade.

* * * * *